(12) United States Patent
Yao et al.

(10) Patent No.: US 11,385,826 B2
(45) Date of Patent: Jul. 12, 2022

(54) METHOD, ELECTRONIC DEVICE AND COMPUTER PROGRAM PRODUCT FOR RESTORING ORPHAN BLOCK VIA REPLICATION

(71) Applicant: EMC IP Holding Company LLC, Hopkinton, MA (US)

(72) Inventors: Sicong Yao, Shanghai (CN);
Changyong Yu, Shanghai (CN);
Jianhua Shao, Shanghai (CN);
Xianlong Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 17 days.

(21) Appl. No.: 17/081,179

(22) Filed: Oct. 27, 2020

(65) Prior Publication Data
US 2022/0035538 A1   Feb. 3, 2022

(30) Foreign Application Priority Data

Jul. 31, 2020  (CN) .......................... 202010759577.6

(51) Int. Cl.
*G06F 3/06*  (2006.01)
(52) U.S. Cl.
CPC .............. *G06F 3/065* (2013.01); *G06F 3/061* (2013.01); *G06F 3/0683* (2013.01)

(58) Field of Classification Search
CPC .................. G06F 3/061; G06F 3/0683; G06F 3/0647–065; G06F 2212/7205
See application file for complete search history.

(56) References Cited

U.S. PATENT DOCUMENTS

| 2012/0095970 A1* | 4/2012 | Shyam | .................. | G06F 16/134 |
| | | | | 707/690 |
| 2021/0223958 A1* | 7/2021 | Yu | .......................... | G06F 12/023 |

* cited by examiner

*Primary Examiner* — Chie Yew
(74) *Attorney, Agent, or Firm* — BainwoodHuang

(57) ABSTRACT

Techniques for storage management involve: if it is determined that a source storage slice of a file system is to be recycled, identifying, from the source storage slice including a plurality of storage blocks, an orphan storage block that is inaccessible by a client of the file system; replicating data of the orphan storage block to a target storage block, the target storage block being located in a target storage slice within a predetermined isolation area of the file system; and generating second metadata of the target storage block based at least on first metadata of the orphan storage block, the second metadata including at least an identification of the orphan storage block. Therefore, the management performance can be improved, and the storage costs can be reduced.

19 Claims, 4 Drawing Sheets

METHOD, ELECTRONIC DEVICE AND COMPUTER PROGRAM PRODUCT FOR RESTORING ORPHAN BLOCK VIA REPLICATION

CROSS-REFERENCE TO RELATED APPLICATION

This application claims priority to Chinese Patent Application No. CN202010759577.6, on file at the China National Intellectual Property Administration (CNIPA), having a filing date of Jul. 31, 2020, and having "METHOD, ELECTRONIC DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure generally relate to storage management, and in particular, to a method, an electronic device, and a computer program product for storage management.

BACKGROUND

An orphan storage block is a storage block in which addressing information allocated by a file system is damaged. Because the addressing information of the orphan storage block is damaged, a client accessing the file system cannot access the orphan storage block. Although the orphan storage block cannot be accessed by the client, it may be detected during internal operations of the file system (e.g., space recycle operations or defragment operations, etc.). These internal operations can traverse all allocated storage blocks in the file system and process the orphan storage block.

When a traditional file system detects an orphan storage block, it will immediately go offline to remove the orphan storage block from the file system. However, because the file system is recovered offline, a time during which data is unavailable due to the file system being offline will severely affect user experience.

SUMMARY OF THE INVENTION

A method, an electronic device, and a computer program product for storage management are provided in the embodiments of the present disclosure.

In a first aspect of the present disclosure, a method for storage management is provided. The method includes: if (or when) it is determined that a source storage slice of a file system is to be recycled, identifying, from the source storage slice including a plurality of storage blocks, an orphan storage block that is inaccessible by a client of the file system; replicating data of the orphan storage block to a target storage block, the target storage block being located in a target storage slice within a predetermined isolation area of the file system; and generating second metadata of the target storage block based at least on first metadata of the orphan storage block, the second metadata including at least an identification of the orphan storage block.

In a second aspect of the present disclosure, there is provided an electronic device. The device includes at least one processing unit and at least one memory. The at least one memory is coupled to the at least one processing unit and stores instructions configured to be executed by the at least one processing unit. The instructions, when executed by the at least one processing unit, cause the device to perform actions including: if it is determined that a source storage slice of a file system is to be recycled, identifying, from the source storage slice including a plurality of storage blocks, an orphan storage block that is inaccessible by a client of the file system; replicating data of the orphan storage block to a target storage block, the target storage block being located in a target storage slice within a predetermined isolation area of the file system; and generating second metadata of the target storage block based at least on first metadata of the orphan storage block, the second metadata including at least an identification of the orphan storage block.

In a third aspect of the present disclosure, there is provided a computer program product. The computer program product is tangibly stored on a non-transitory computer readable medium and includes machine-executable instructions; and the machine-executable instructions, when executed, cause a machine to perform any step of the method described according to the first aspect of the present disclosure.

The summary is provided to introduce the selection of concepts in a simplified form, which will be further described in the Detailed Description below. The summary is neither intended to identify key features or essential features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

In the accompanying drawings, the same or corresponding numerals represent the same or corresponding parts.

DETAILED DESCRIPTION

Figure 1:
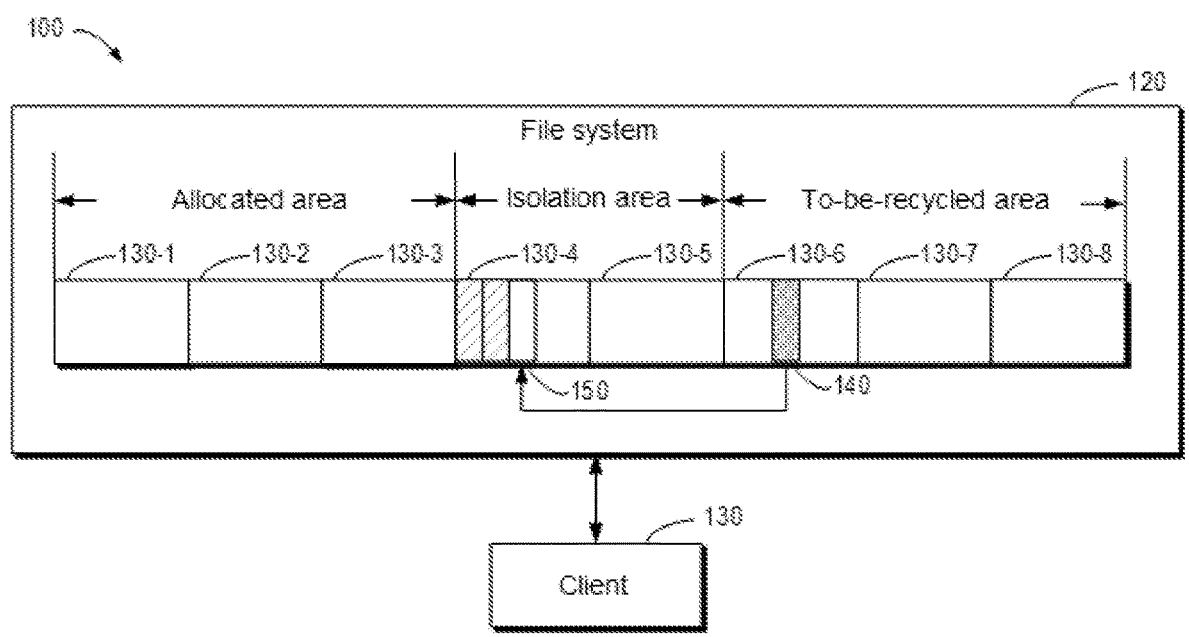
FIG. 1 shows a schematic diagram of an example of a storage management environment in which some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Traditionally, a file system can perform some internal operations (such as space recycle operations or defragment operations) to recycle space. A unit in which the file system recycles space is referred to as a storage slice. The storage slice includes a plurality of storage blocks. For example, the size of a storage slice may be 256 MB, and the size of a storage block may be 8 KB. When an orphan storage block is detected during an internal operation of the file system, the file system will immediately go offline to perform a recover operation and interrupt the internal operation being performed. If a storage slice contains an orphan storage block, the recycle of both the orphan storage block itself and the entire storage slice will fail. It can be seen that the orphan storage block will significantly reduce the storage management efficiency.

In addition, only after the file system has performed an offline recover operation, will the orphan storage block be removed or recycled, and the file system go online again. However, the time during which data is unavailable due to the file system being offline will significantly affect a user's use of the file system.

Further, in some cases, a parent directory structure may be damaged, so that files in the damaged directory become orphan inodes. The offline recover operation of the file system can provide new names for these files and put these files in a specified directory. A client can find these files by searching for the specified directory. The disadvantage of the above method is that it can only recover orphan inodes caused by damage of the parent directory. The above method will not work in the case of orphan storage blocks caused by mapping pointer damage or reference mismatch.

Even if the above method is improved to be able to recycle orphan storage blocks and provide addressable inodes and offsets for these orphan storage blocks, the user will still lose data in the orphan storage blocks. This is because the recycled files are actually only sparsely stored in some discrete storage blocks, and the user usually cannot easily determine the relationship between the recycled orphan storage blocks and the original files. For example, for an original file that records an article, if the recycled orphan storage block stores data "apple," the user cannot determine the context between the data "apple" and the entire article. In a file system with compression enabled, the recycled isolated blocks will become more meaningless.

According to an example embodiment of the present disclosure, an improved solution for storage management is proposed. In this solution, if it is determined that a source storage slice of a file system is to be recycled, the file system may identify, from the source storage slice including a plurality of storage blocks, an orphan storage block that is inaccessible by a client of the file system. The file system may replicate data of the orphan storage block to a target storage block. The target storage block is located in a target storage slice within a predetermined isolation area of the file system. Further, the file system may generate second metadata of the target storage block based at least on first metadata of the orphan storage block, and the second metadata includes at least an identification of the orphan storage block.

In this way, in the present solution, when an orphan storage block is detected, the file system will not go offline, thereby avoiding the significant impact of the time during which data is unavailable due to the file system being offline. In addition, orphan storage blocks will not interrupt the recycle of storage slices. In addition, the space consumed by storing data of orphan storage blocks in the isolation area is significantly less than the available space generated by the recycle of storage slices, thus increasing the space of the file system.

In the following, specific examples of the solution will be described in more detail with reference to FIG. 1 to FIG. 4. FIG. 1 shows a schematic diagram of an example of storage management environment 100 according to some embodiments of the present disclosure. Storage management environment 100 includes file system 120 and client 130.

Client 130 may access data in file system 120. For example, client 130 may access the data in file system 120 through an interface provided by file system 120. File system 120 may manage storage space for storing data or files. It should be understood that the storage space may be implemented by any device with storage capabilities, such as any magnetic storage device or optical storage device. The storage space may include a plurality of storage slices 130-1 to 130-8 (hereinafter collectively referred to as "storage slices"). Each storage slice 130 includes a plurality of storage blocks.

The storage space may include an allocated area, a to-be-recycled area, and a predetermined isolation area. The allocated area includes storage slices allocated from a storage pool to store data, such as storage slices 130-1 to 130-3. The to-be-recycled area includes storage slices to be recycled, such as storage slices 130-6 to 130-8. In some cases, among the storage slices to be recycled, there may be an orphan storage block, such as orphan storage block 140 in storage slice 130-6 (hereinafter referred to as "source storage slice"). As described above, client 130 may access data in file system 120. However, because the addressing information pointing to orphan storage block 140 is damaged, orphan storage block 140 cannot be accessed by client 130.

As described above, traditionally, when the file system recycles storage slices in the to-be-recycled area, if the file system detects an orphan storage block, the file system will interrupt the recycle operation and perform offline recovery to remove or recycle the orphan storage block. However, this will result in a undesirable time during which data is unavailable. For this reason, in the present solution, an isolation area is created in the storage space. The isolation area may isolate an orphan storage block from normal storage blocks accessible by client 130. For example, an isolation area may be created at the end of the storage space of the file system and before the to-be-recycled area. The isolation area includes storage slices for storing data of orphan storage blocks, such as storage slices 130-4 to 130-5.

In some embodiments, in the case where orphan storage block 140 is detected from source storage slice 130-6 being recycled by file system 120, file system 120 replicates data in orphan storage block 140 from source storage slice 130-6 to a free location within the isolation area, such as free storage block 150 (hereinafter referred to as "target storage block") in storage slice 130-4 (hereinafter referred to as "target storage slice"), and releases orphan storage block 140. After replicating the data in orphan storage block 140 to target storage block 150, file system 120 may recycle storage slice 130-6 into the storage pool for future reallocation. In this case, when orphan storage block 140 is detected, file system 120 may also continue to recycle storage slice 130-6, instead of interrupting the recycle operation, and will not cause a time during which data is unavailable. Therefore, the performance and user experience of file system 120 can be improved.

In addition, the data of orphan storage blocks is gathered in the isolation area. A storage slice in the isolation area may include a plurality of storage blocks. Therefore, even if there are a plurality of orphan storage blocks distributed among a plurality of storage slices in the to-be-recycled area, these orphan storage blocks can be accommodated by one or a few of the storage slices in the isolation area. Therefore, the space cost of file system 120 is significantly reduced.

In addition, in some embodiments, data of a plurality of orphan storage blocks is sequentially stored in the isolation area, so that fast retrieval may be achieved. Meanwhile, in order to ensure data consistency, file system 120 also generates identification mapping information and metadata to track the replicate operation. In the following, the identification mapping information and the metadata will be described in detail.

Figure 2:
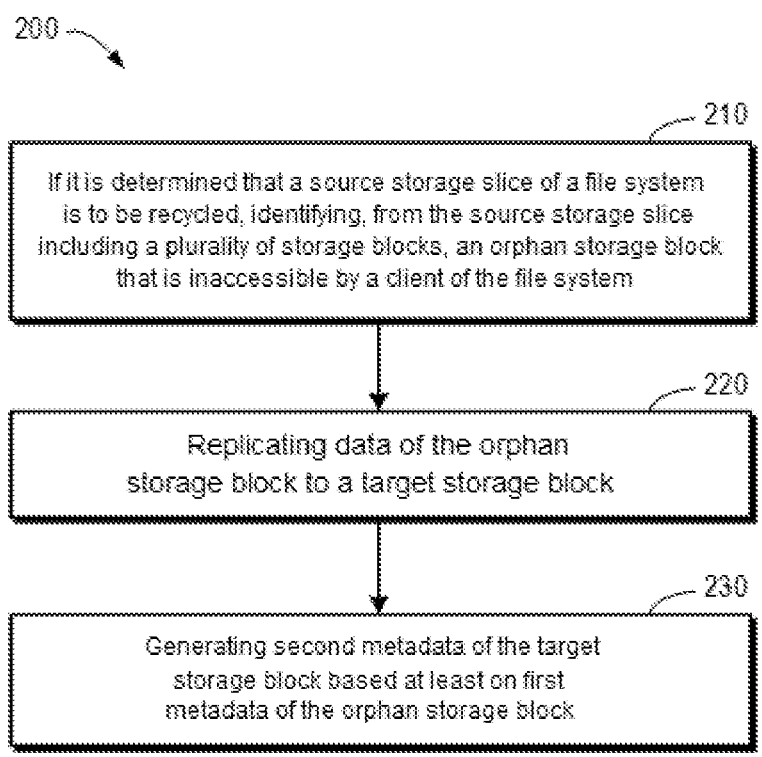
FIG. 2 shows a flowchart of a method for storage management according to some embodiments of the present disclosure.

The operations performed by file system 120 will be described in detail below with reference to FIG. 2 to FIG. 3. FIG. 2 shows a flowchart of method 200 for storage management according to some embodiments of the present disclosure. For example, method 200 may be performed by file system 120 as shown in FIG. 1. It should be understood that method 200 may also include additional steps not shown and/or may skip the steps shown, and that the scope of the present disclosure is not limited in this respect. For ease of understanding, method 200 will be described with reference to FIG. 3.

In some embodiments, file system 120 may determine whether source storage slice 130-6 of file system 120 is to be recycled. If source storage slice 130-6 of file system 120 is to be recycled, at 210, file system 120 identifies, from source storage slice 130-6 including a plurality of storage blocks, orphan storage block 140 that is inaccessible by client 130 of file system 120.

At 220, file system 120 replicates data of orphan storage block 140 to target storage block 150 in target storage slice 130-4 located within a predetermined isolation area of file system 120. In addition, in addition to replicating the data of orphan storage block 140 to target storage block 150, file system 120 may also generate metadata of target storage block 150. At 230, file system 120 generates the metadata of target storage block 150 (hereinafter referred to as "second metadata") based at least on metadata of orphan storage block 140 (hereinafter referred to as "first metadata"). In particular, the second metadata may include the identification of orphan storage block 140, so that it may indicate that the data of target storage block 150 comes from orphan storage block 140. It should be understood that the identification of a storage block is information that may uniquely determine the storage block in file system 120 and may be used to address the storage block. For example, the identification of the storage block may be the file system block number of the storage block.

Further, in some embodiments, file system 120 may also generate identification mapping information of target storage block 150 based on the identification of orphan storage block 140 and the identification of target storage block 150 for tracking the replicate operation.

Figure 3:
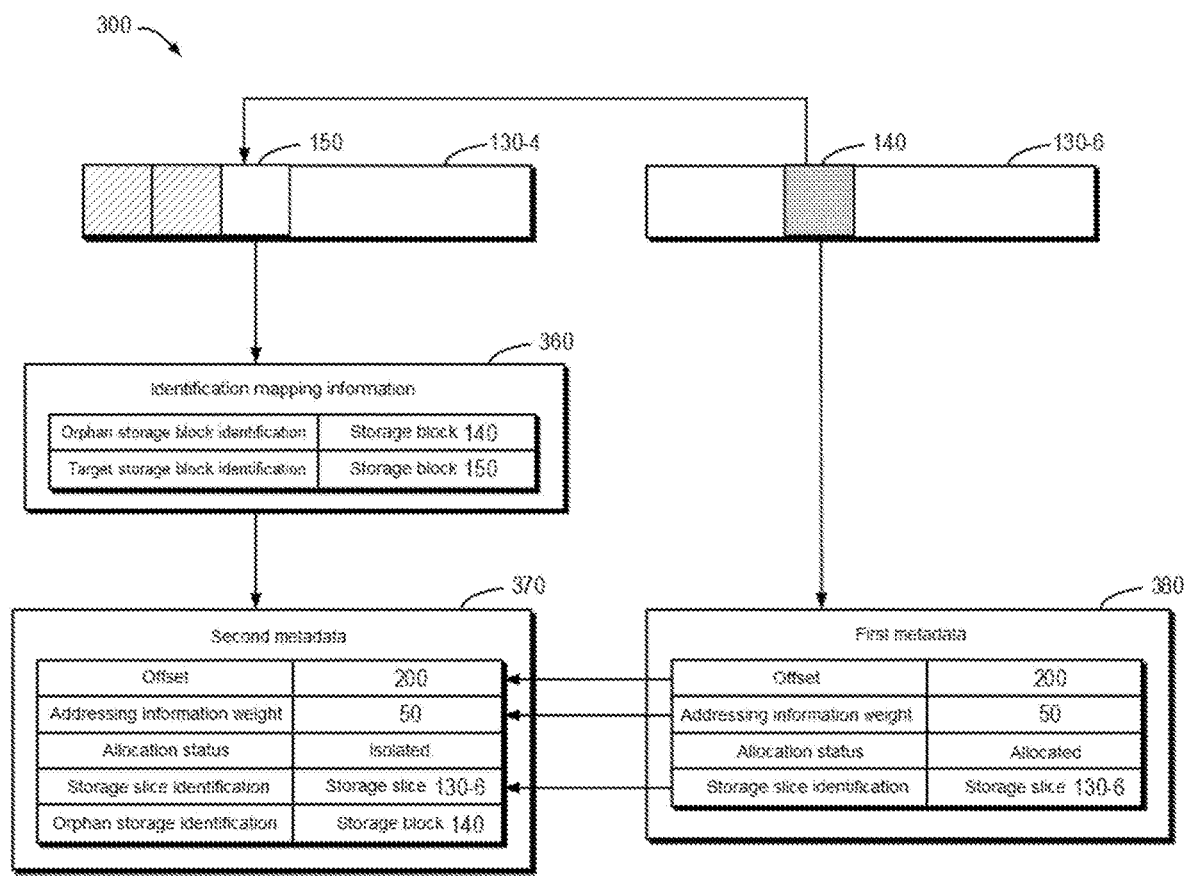
FIG. 3 shows a schematic diagram of examples of identification mapping information and metadata according to some embodiments of the present disclosure.

In order to facilitate understanding, FIG. 3 shows schematic diagram 300 of examples of identification mapping information and metadata according to some embodiments of the present disclosure. As shown in FIG. 3, identification mapping information 360 of target storage block 150 includes an identification of an orphan storage block (e.g., "storage block 140") and an identification of a target storage block (e.g., "storage block 150").

In addition, second metadata 370 of target storage block 150 may include an identification of an orphan storage block, an identification of a source storage slice, an offset of the orphan storage block in the source storage slice, an addressing information weight, and/or an allocation status. The addressing information weight represents a proportion of data in a storage block that is associated with addressing information of the storage block in the storage block. The allocation status indicates whether the storage block is allocated, unallocated, or isolated.

For example, second metadata 370 may be generated in the following manner. Specifically, file system 120 may acquire the identification of orphan storage block 140 (e.g., "storage block 140"), and set the identification of the orphan storage block in second metadata 370 to the acquired identification of orphan storage block 140. In addition, file system 120 may generate second metadata 370 based on first metadata 380 of orphan storage block 140. Specifically, file system 120 may replicate the identification of the source storage slice, the offset of the orphan storage block in the source storage slice, and the addressing information weight in first metadata 380 to corresponding items in second metadata 370. Further, with respect to the allocation status, file system 120 may set the allocation status in second metadata 370 to isolated, to indicate that target storage block 150 is within a predetermined isolation area.

In some embodiments, identification mapping information 360 may be stored in a memory of file system 120. The memory may be volatile. Second metadata 370 may be stored in a storage device of file system 120. The storage device may be non-volatile. In this case, identification mapping information 360 will be lost after file system 120 is closed. For this reason, after file system 120 is restarted, second metadata 370 may be used to recover or reconstruct identification mapping information 360. For example, file system 120 may recover the identification of the orphan storage block in identification mapping information 360 based on the identification of the orphan storage block in second metadata 370. In addition, file system 120 may acquire the identification of target storage block 150 to recover the identification of the target storage block in identification mapping information 360.

Further, in order to avoid degradation of access performance of file system 120 due to frequent checking of the identification mapping information, file system 120 may also generate orphan storage block index information for source storage slice 130-6. The orphan storage block index information may indicate orphan storage blocks in source storage slice 130-6. For example, the orphan storage block index information may indicate a corresponding location, in a storage slice, of one or more orphan storage blocks in the storage slice, thereby avoiding writing data into the orphan storage block. Specifically, in some embodiments, after the recycled source storage slice 130-6 is reallocated, file system 120 may, based on the orphan storage block index information, store data in a storage block in the reallocated source storage slice 130-6 other than orphan storage block 140.

In addition, as described above, orphan storage blocks are inaccessible due to addressing information damage. The addressing information may include inode information and mapping pointer information. The inode information includes the identification of source storage slice 130-6 and the offset of orphan storage block 140 in source storage slice 130-6. The mapping pointer information includes the identification of orphan storage block 140. Since addressing information includes inode information and mapping pointer information, the inaccessibility of an orphan storage block may be caused by damage of the inode information or by damage of the mapping pointer information. In the present solution, since mapping pointer information 360 and second metadata 370 are generated, file system 120 can tolerate these two situations and recover the damaged addressing information.

Specifically, for the situation where the inaccessibility of orphan storage block 140 is caused by damage of the mapping pointer information in the addressing information, a traditional file system will, when recovering, mark the mapping pointer information as damaged and remove the orphan storage block. Therefore, although the file system is recovered, the data originally pointed to by the damaged mapping pointer information is lost. To solve this problem, in the present solution, file system 120 may use the second metadata to recover the mapping pointer information. For example, file system 120 may determine second metadata corresponding to the identification of the source storage slice in the inode information in the addressing information and the offset of the orphan storage block in the source storage slice. For example, the determined identification and offset of the source storage slice of the second metadata may be the same as the identification and offset of the source storage slice in the inode information. Then, file system 120 may update the identification of the orphan storage block in the mapping pointer information to the identification of the orphan storage block in the second metadata.

For the situation where the inaccessibility of orphan storage block 140 is caused by damage of the inode information in the addressing information, if a request to access orphan storage block 140 is received after the inode information is recovered by file system 120, file system 120 may determine the identification of target storage block 150 corresponding to the identification of orphan storage block 140 in the mapping pointer information based on identification mapping information 360, and access target storage block 150 based on the identification of target storage block 150.

In this way, based on the mapping pointer information and the second metadata, file system 120 may reduce the possibility of data loss on the orphan storage block, and may increase the possibility of keeping the data intact.

Figure 4:
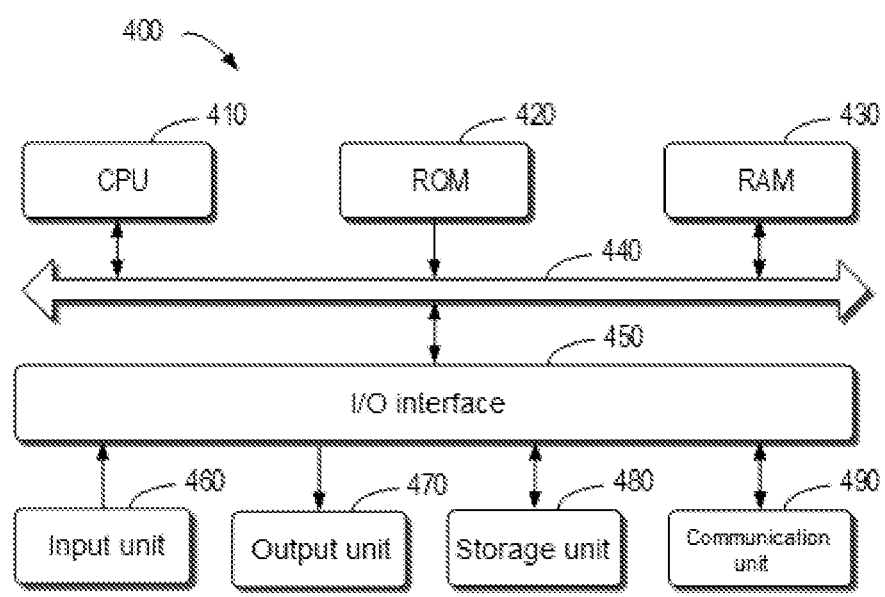
FIG. 4 shows a schematic block diagram of an example device that can be configured to implement an embodiment of content of the present disclosure.

FIG. 4 shows a schematic block diagram of example device 400 that can be configured to implement an embodiment of the present disclosure. For example, file system 120 as shown in FIG. 1 may be implemented by device 400. As shown in the figure, device 400 includes central processing unit (CPU) 410 that may perform various appropriate actions and processing according to computer program instructions stored in read-only memory (ROM) 420 or computer program instructions loaded from storage unit 480 to random access memory (RAM) 430. In RAM 430, various programs and data required for the operation of device 400 may also be stored. CPU 410, ROM 420, and RAM 430 are connected to each other through bus 440. Input/output (I/O) interface 450 is also connected to bus 440.

A plurality of components in device 400 are coupled to I/O interface 450, including: input unit 460, such as a keyboard and a mouse; output unit 470, such as various types of displays and speakers; storage unit 480, such as a magnetic disk and an optical disc; and communication unit 490, such as a network card, a modem, and a wireless communication transceiver. Communication unit 490 allows device 400 to exchange information/data with other devices over a computer network such as the Internet and/or various telecommunication networks.

The various processes and processing described above, for example, method 200, may be performed by processing unit 410. For example, in some embodiments, method 200 may be implemented as a computer software program that is tangibly included in a machine-readable medium such as storage unit 480. In some embodiments, some or all of the computer programs may be loaded and/or installed onto device 400 through ROM 420 and/or communication unit 490. When the computer program is loaded into RAM 430 and executed by CPU 410, one or more actions of method 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In a case where a remote computer is involved, the remote computer can be connected to a user computer through any kind of networks, including a local area network (LAN) or a wide area network (WAN), or can be connected to an external computer (e.g., connected through the Internet using an Internet service provider). In some embodiments, an electronic circuit, such as a programmable logic circuit, a field programmable gate array (FPGA), or a programmable logic array (PLA), can be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and changes are apparent to those of ordinary skill in the art without departing from the scope and spirit of the various illustrated embodiments. The selection of terms as used herein is intended to best explain the principles and practical applications of the various embodiments or technical improvements to technologies on the market, or to enable other persons of ordinary skill in the art to understand the embodiments disclosed herein.

The invention claimed is:

1. A method for storage management, comprising:
in response to determination that a source storage slice of a file system is to be recycled, identifying, from the source storage slice comprising a plurality of storage blocks, an orphan storage block that is inaccessible by a client of the file system;
after the identifying, replicating data of the orphan storage block to a target storage block, the target storage block being located in a target storage slice within a predetermined isolation area of the file system; and
after the identifying, generating second metadata of the target storage block based at least on first metadata of the orphan storage block, the second metadata comprising at least an identification of the orphan storage block.

2. The method according to claim 1, wherein generating the second metadata comprises at least one of:
generating an identification of the source storage slice in the second metadata based on a first identification of the source storage slice in the first metadata;
generating, based on a first offset of the orphan storage block, in the first metadata, in the source storage slice, an offset of the orphan storage block, in the second metadata, in the source storage slice; and
generating, based on an addressing information weight in the first metadata, an addressing information weight in the second metadata, the addressing information weight in the first metadata representing a proportion of the data in the orphan storage block that is associated with addressing informations, the orphan storage block, in the orphan storage block.

3. The method according to claim 2, wherein generating the second metadata further comprises:
setting an allocation status in the second metadata to isolated, to indicate that the target storage block is within the predetermined isolation area.

4. The method according to claim 2, wherein the orphan storage block is inaccessible due to damage of mapping pointer information in the addressing information, and the method further comprises:
determining the second metadata corresponding to the identification of the source storage slice in inode information in the addressing information and the offset of the orphan storage block in the source storage slice; and
updating identification of the orphan storage block in the mapping pointer information to the identification of the orphan storage block in the second metadata.

5. The method according to claim 1, further comprising: generating, based on the identification of the orphan storage block, in the second metadata, and identification of the target storage block, identification mapping information of the target storage block.

6. The method according to claim 5, wherein the identification mapping information will be lost after the file system is closed, and the method further comprises:
in response to the file system being restarted, restoring identification of the orphan storage block in the identification mapping information based on the identification of the orphan storage block in the second metadata.

7. The method according to claim 5, wherein the orphan storage block is inaccessible due to damage of inode information in the addressing information of the orphan storage block, and the method further comprises:
in response to a request to access the orphan storage block being received after the inode information is recovered by the file system, determining, based on the identification mapping information, the identification of the target storage block corresponding to identification of the orphan storage block in the mapping pointer information; and
accessing the target storage block based on the identification of the target storage block.

8. The method according to claim 1, further comprising: generating orphan storage block index information of the source storage slice, the orphan storage block index information indicating the orphan storage block in the source storage slice.

9. The method according to claim 8, further comprising: after the recycled source storage slice is reallocated, storing, based on the orphan storage block index information, data in a storage block in the reallocated source storage slice other than the orphan storage block.

10. An electronic device, comprising:
at least one processing unit; and
at least one memory coupled to the at least one processing unit and storing instructions configured to be executed by the at least one processing unit, wherein the instructions, when executed by the at least one processing unit, cause the device to perform actions comprising:
in response to determining that a source storage slice of a file system is to be recycled, identifying, from the source storage slice comprising a plurality of storage blocks, an orphan storage block that is inaccessible by a client of the file system;
after the identifying, replicating data of the orphan storage block to a target storage block, the target storage block being located in a target storage slice within a predetermined isolation area of the file system; and
after the identifying, generating second metadata of the target storage block based at least on first metadata of the orphan storage block, the second metadata comprising at least an identification of the orphan storage block.

11. The device according to claim 10, wherein generating the second metadata comprises at least one of:
generating an identification of the source storage slice in the second metadata based on a first identification of the source storage slice in the first metadata;
generating, based on a first offset of the orphan storage block, in the first metadata, in the source storage slice, an offset of the orphan storage block, in the second metadata, in the source storage slice; and
generating, based on an addressing information weight in the first metadata, an addressing information weight in the second metadata, the addressing information weight in the first metadata representing a proportion of the data in the orphan storage block that is associated with addressing informations, of the orphan storage block, in the orphan storage block.

12. The device according to claim 11, wherein generating the second metadata further comprises:
setting an allocation status in the second metadata to isolated, to indicate that the target storage block is within the predetermined isolation area.

13. The device according to claim 11, wherein the orphan storage block is inaccessible due to damage of mapping pointer information in the addressing information, and the method further comprises:
determining the second metadata corresponding to the identification of the source storage slice in inode information in the addressing information and the offset of the orphan storage block in the source storage slice; and
updating identification of the orphan storage block in the mapping pointer information to the identification of the orphan storage block in the second metadata.

14. The device according to claim 10, wherein the actions further comprise:
generating, based on the identification of the orphan storage block, in the second metadata, and identification of the target storage block, identification mapping information of the target storage block.

15. The device according to claim 14, wherein the identification mapping information will be lost after the file system is closed, and the method further comprises:
in response to the file system being restarted, restoring identification of the orphan storage block in the identification mapping information based on the identification of the orphan storage block in the second metadata.

16. The device according to claim 14, wherein the orphan storage block is inaccessible due to damage of inode information in the addressing information of the orphan storage block, and the method further comprises:
in response to a request to access the orphan storage block being received after the inode information is recovered by the file system, determining, based on the identification mapping information, the identification of the target storage block corresponding to identification of the orphan storage block in the mapping pointer information; and accessing the target storage block based on the identification of the target storage block.

17. The device according to claim 10, wherein the actions further comprise:

generating orphan storage block index information of the source storage slice, the orphan storage block index information indicating the orphan storage block in the source storage slice.

18. The device according to claim 17, wherein the actions further comprise:

after the recycled source storage slice is reallocated, storing, based on the orphan storage block index information, data in a storage block in the reallocated source storage slice other than the orphan storage block.

19. A computer program product having a non-transitory computer readable medium which stores a set of instructions to perform storage management; the set of instructions, when carried out by computerized circuitry, causing the computerized circuitry to perform a method of:

in response to determining that a source storage slice of a file system is to be recycled, identifying, from the source storage slice comprising a plurality of storage blocks, an orphan storage block that is inaccessible by a client of the file system;

after the identifying, replicating data of the orphan storage block to a target storage block, the target storage block being located in a target storage slice within a predetermined isolation area of the file system; and after the identifying, generating second metadata of the target storage block based at least on first metadata of the orphan storage block, the second metadata comprising at least an identification of the orphan storage block.

* * * * *